(12) United States Patent
Mashinsky

(10) Patent No.: US 8,890,472 B2
(45) Date of Patent: Nov. 18, 2014

(54) SELF-CHARGING ELECTRIC VEHICLES AND AIRCRAFT, AND WIRELESS ENERGY DISTRIBUTION SYSTEM

(76) Inventor: Alex Mashinsky, Memphis, TN (US)

( * ) Notice: Subject to any disclaimer, the term of this patent is extended or adjusted under 35 U.S.C. 154(b) by 538 days.

(21) Appl. No.: 12/679,060

(22) PCT Filed: Sep. 26, 2008

(86) PCT No.: PCT/US2008/011204
§ 371 (c)(1),
(2), (4) Date: Mar. 19, 2010

(87) PCT Pub. No.: WO2009/042214
PCT Pub. Date: Apr. 2, 2009

(65) Prior Publication Data
US 2010/0231163 A1    Sep. 16, 2010

Related U.S. Application Data

(60) Provisional application No. 60/995,396, filed on Sep. 26, 2007, provisional application No. 60/998,064, filed on Oct. 5, 2007.

(51) Int. Cl.
| | |
|---|---|
| *H02J 7/00* | (2006.01) |
| *H02J 7/14* | (2006.01) |
| *H02J 7/02* | (2006.01) |
| *H02J 5/00* | (2006.01) |
| *B60L 11/18* | (2006.01) |

(52) U.S. Cl.
CPC ............ *B60L 11/182* (2013.01); *H02J 7/0027* (2013.01); *Y02T 90/125* (2013.01); *Y02T 90/12* (2013.01); *H02J 5/005* (2013.01); *B60L 11/185* (2013.01); *H02J 7/025* (2013.01); *Y02T 90/122* (2013.01); *B60L 11/1838* (2013.01); *B60L 11/1831* (2013.01); *Y02T 90/14* (2013.01); *Y02T 10/7088* (2013.01); *Y02T 10/7005* (2013.01); *B60L 11/1842* (2013.01)
USPC ............ 320/109; 320/107; 320/108; 307/104

(58) Field of Classification Search
USPC ................... 320/104, 108, 109, 137; 180/2.1; 191/10; 318/16; 307/104
See application file for complete search history.

(56) References Cited

U.S. PATENT DOCUMENTS 5,528,113 A * 6/1996 Boys et al. .................. 318/16
5,669,470 A * 9/1997 Ross ............................. 191/10
5,821,728 A * 10/1998 Schwind ...................... 320/108

(Continued)

FOREIGN PATENT DOCUMENTS

JP    2009106136 A  *  5/2009

OTHER PUBLICATIONS

International Search Reported dated Nov. 19, 2008.

*Primary Examiner* — Edward Tso
*Assistant Examiner* — Alexis A Boateng
(74) *Attorney, Agent, or Firm* — Chi Eng

(57) ABSTRACT

A method and system for efficient distribution of power using wireless means, and a system and method for wireless power distribution to provide electric devices, such as vehicles with a way to continuously and wirelessly collect, use and charge their power systems and thereby use the transmitted power for operation. The system and method allows a hybrid, simplified and less costly way to charge devices, such as vehicles so that the devices continuously operate while charging/recharging.

14 Claims, 7 Drawing Sheets

(56) References Cited

U.S. PATENT DOCUMENTS

| | | | |
|---|---|---|---|
| 6,879,889 B2* | 4/2005 | Ross | 701/22 |
| 7,068,991 B2* | 6/2006 | Parise | 455/343.1 |
| 7,164,211 B1* | 1/2007 | Tafoya et al. | 290/1 R |
| 7,602,143 B2* | 10/2009 | Capizzo | 320/109 |
| 8,008,888 B2* | 8/2011 | Oyobe et al. | 320/108 |
| 2001/0012208 A1* | 8/2001 | Boys | 363/23 |
| 2003/0200025 A1* | 10/2003 | Ross | 701/200 |
| 2006/0082334 A1 | 4/2006 | Correa et al. | |
| 2007/0182367 A1* | 8/2007 | Partovi | 320/108 |
| 2007/0219590 A1 | 9/2007 | Hastings et al. | |
| 2009/0272587 A1* | 11/2009 | Ippolito | 180/65.1 |
| 2010/0225271 A1* | 9/2010 | Oyobe et al. | 320/108 |

* cited by examiner

PRIMARY CIRCUIT

SECONDARY CIRCUIT

SOLENOID CONFIGURATION

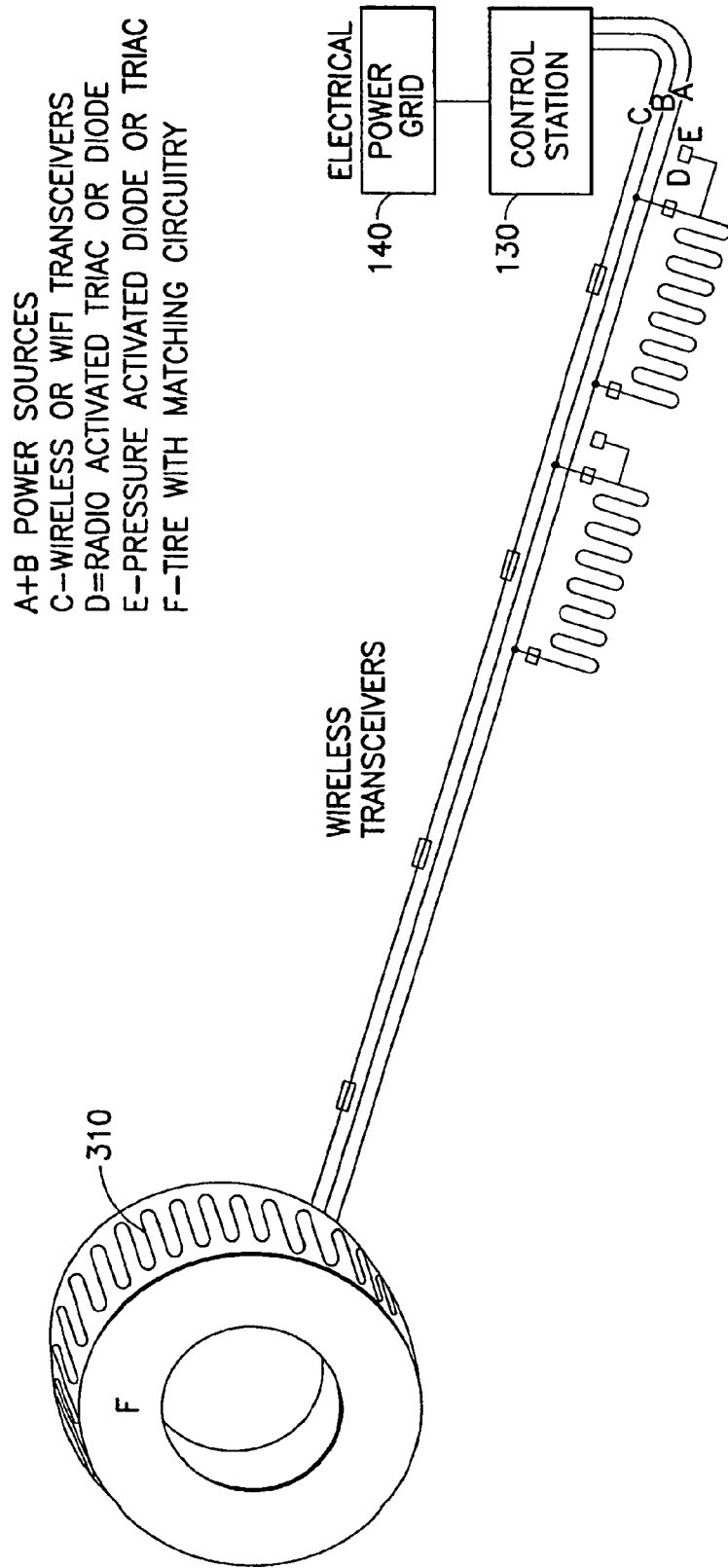

SELF-CHARGING ELECTRIC VEHICLES AND AIRCRAFT, AND WIRELESS ENERGY DISTRIBUTION SYSTEM

RELATED APPLICATIONS

This is a U.S. national stage of application No. PCT/US08/11204, filed on Sep. 26, 2008. Priority is claimed on the following applications: U.S. Provisional Application No. 60/995,396 Filed on Sep. 26, 2007; U.S. Provisional Application No. 60/998,064 Filed on Oct. 5, 2007, the content of which are incorporated here by reference.

BACKGROUND OF THE INVENTION

1. Field of the Invention

The present invention generally relates to the field of power transmission and, more particularly, to a method and system for efficient distribution of power using wireless means, and a system and method for wirelessly distributing power to provide electrical vehicles with a way to continuously, wirelessly charge their power systems and thereby use the transmitted power for motion.

2. Description of the Related Art

The amount of energy a battery can store per unit volume is presently increasing by about 8% a year. Yet, the needs of ever more powerful electronic devices are increasing at a rate more than three times that amount. One way to obtain energy is to 'harvest' energy from the environment by converting heat, wind, light or vibrations that occur naturally. For example, sensors in a skyscraper could generate energy by sensing the normal sway of the skyscraper. Certain materials are 'piezoelectric', i.e., they naturally become deformed by heat or vibrations, generating an electrical current that can be captured and stored. Such technology is at an emerging stage, but advancing rapidly. Commercial products are available from a host of companies such as Perpetuum in Britain, and Ferro Solutions, Midé Technology, KCF, TPL and MicroStrain in America. The constraint here is that very little energy is generated and the harvesting mechanisms are sometimes larger than the devices they are designed to power.

Another solution to the energy problem may be found in fuel cells. Unlike batteries, which simply store energy, fuel cells actually generate energy from volatile chemicals, such as hydrogen or methanol. The fundamental technology currently exists to recharge devices such as mobile phones. However, such systems are impractical, because they are limited in their portability, for example, boarding an aircraft with a full-fledged fuel cell in a laptop.

A solution to the need for alternative energy sources is an ongoing effort. For example, techniques to wirelessly transfer energy are currently under development. One such technique is referred to as 'radiative', which entails generating an electromagnetic field. Here, a special receiver picks up a 'bit' that has not naturally dissipated in the environment and converts it to electricity. The energy can travel nearly three meters (ten feet) to keep a small battery charged. However, most of the energy is lost before reaching the receiver and the power that does reach the receiver is extremely low. Nevertheless, such a technology, which is pioneered by Powercast in Philadelphia, Pa., can be deployed for small power applications, such as lights on Christmas decorations.

Another known technique relies on magnetic fields. However, this technique is still rather experimental, and operates based on principles of resonance. When two objects resonate at the same frequency, they transfer energy efficiently. The use of magnetic resonance allows the transfer of energy in useful quantities and almost entirely to the receiving device. However, as in the radiative method, the energy can travel only a distance of a few meters. Nevertheless, there has been a great demand and interest in transferring energy using magnetic resonance.

'Inductive coupling' is another way of transferring energy. Here, power or energy is sent on almost direct contact, for example, with a mat upon which gadgets can be placed to recharge. The method avoids the need for cables and connectors to charge gadgets, and can be built into many surfaces, such as car dashboards or office furniture.

At present there is technology directed to hybrids and other forms of vehicles that use different systems to internally generate and store electricity for use in providing motion to a vehicle. However, while there are vehicles that can be recharged, these vehicles do not permit recharging during motion, and require a cable attachment to the vehicle and a long charge time. As a result, these types of vehicles can only cover short distances.

It is therefore apparent there is a need to provide energy to a vehicle that will eliminate the restrictions associated with conventional charging techniques.

SUMMARY OF THE INVENTION

Systems and methods are disclosed for wirelessly transmitting power to electric vehicles to allow such vehicles to continuously, wirelessly charge their power systems from the transmitted power.

One embodiment of the system and method of the invention utilizes capacitors and/or fast rechargeable batteries which are connected to a wireless coil antenna or electrode plates to achieve rapid collection and storage of electrical energy from the magnetic resonance generated by another antenna located in close proximity connected to a power generator.

In another embodiment, a method and system is provided for wireless power distribution. Here, the system utilizes a power source, a large primary coil, and a secondary coil for each separate wireless power receiver. The primary coil circumscribes the region for which the power must be distributed within. For example, using the contemplated method and system, a major component of the power distribution system for Manhattan, N.Y., would comprise a thick conductor that loops around Manhattan multiple times. The coil can be wound in a flat, i.e., pancake shape or a cylindrical shape. In accordance with the contemplated embodiments, the primary coil is powered by an oscillating voltage or current source of a high frequency. Each secondary coil, or wireless power receiver, can be at rest or moving with respect to the circumscribed region. In addition, the wireless power receiver can be above, below or at the same elevation as the circumscribed region. For example, using the contemplated method and system, an airplane, car or other transportation vehicle would contain a secondary coil receiver that powers the motor of the transporter. The configuration of the secondary coil is such that it electrically resonates at the frequency of the powered primary coil, i.e., at the resonant frequency. Thus, an induced oscillating electric current in the primary coil induces an oscillating electric current in each secondary coil. If a particular secondary coil has a resonate frequency at the frequency of the oscillating current in the primary, then the secondary coil will be supplied power.

By continuously charging the onboard batteries of the vehicle through the wireless system, the vehicle can extend its range and provide for continuous, uninterrupted operation. The vehicle uses its aerials or antennas for power reception and then transfers such power to the motor or a storage device, in another embodiment involving the Tesla effect the ground is used as a return to allow for collection and storage of electrical energy, with the capacitors, batteries and motors being connected in between the antennas and ground. At any moment in time, the energy collected by the vehicle may be more or less than what is needed to propel the vehicle. As a result, the vehicle will either contribute or draw upon the stored electrical energy in the onboard batteries and capacitors. At rest, a vehicle located near or on top of a wirelessly power transmitting device may signal to absorb or return power to the grid based on the owners needs or preferences. Since during peak hours such power can be better utilized by others.

The system and method of the invention differs from conventional systems for transmitting energy because a higher transmission efficiency and a greater transmission distance are provided due the use of a different configuration and transmission frequencies. In accordance with the invention, the receiving vehicle communicates with a transmitter in a manner such that an electromagnetic field required by a vehicle in a specific geography is generated only when power or energy is needed. As a result, the system and method provides an efficient system in that resources are not consumed unnecessarily.

Security is provided from unauthorized use by combining multiple resonating frequencies on the transmit and receive side of the wireless transmission system to thereby improve efficiency and secure the transmission from unauthorized parties. In another embodiment each electrical vehicle identifies itself to the network to initiate transmission.

Dynamic switching between directional and omni-transmission of the radiation is also provided to permit optimal efficiency of power transmission. The system and method can be advantageously used at high altitudes or in flight to provide long range transmission of power. To maximize efficiency in transmitting power to airborne vehicles, a high-power ultraviolet beam might be used to form a vertical or horizontal ionized channel in the air directly above the mobile transmitter or receiver stations. Such transmission may originate from Earth or from power generating satellites. For example a satellite orbiting the earth which may have 50 miles of electrical conducting cable suspended horizontally to the magnetic field of the earth can generate up to megawatts of continuous power since the magnetic field of the earth is acting as a generator and is moving electrons to create charge at the edge of such cable. If a resonating device directs such electromagnetic energy to a plane flying at 30,000 feet which is tuned to the same resonance an efficient transfer of electrical power can take place since the density of the stratosphere and the absorption levels are low. Such power generating effect was recorded by NASA during the 1996 Tethered Satellite experiments but no transmission of such power was attempted.

Although the various embodiments of the invention are described above in connection with supplying power to vehicles, such power can also be provided to other types of mobile devices which require periodic charging, such as mobile computers, mobile phones and other types of portable devices. In such instances the portable devices will include on-board receiving apparatus for receiving the wirelessly transmitted power.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 9 is a schematic illustration of tires of a vehicle configured to permit wireless distribution of power to the vehicle;

DETAILED DESCRIPTION OF THE EXEMPLARY EMBODIMENTS

Disclosed is a method and system for efficient distribution of power using wireless means, and a system and method for wireless power distribution to provide electric vehicles with a way to continuously and wirelessly collect, use and charge their power systems and thereby use the transmitted power to effect movement.

In accordance with the invention, a system and method are provided that allows a hybrid, simplified and less costly solution for charging and providing a way for vehicles (or mobile devices) to continuously move while consuming, charging/recharging.

Figure 1:
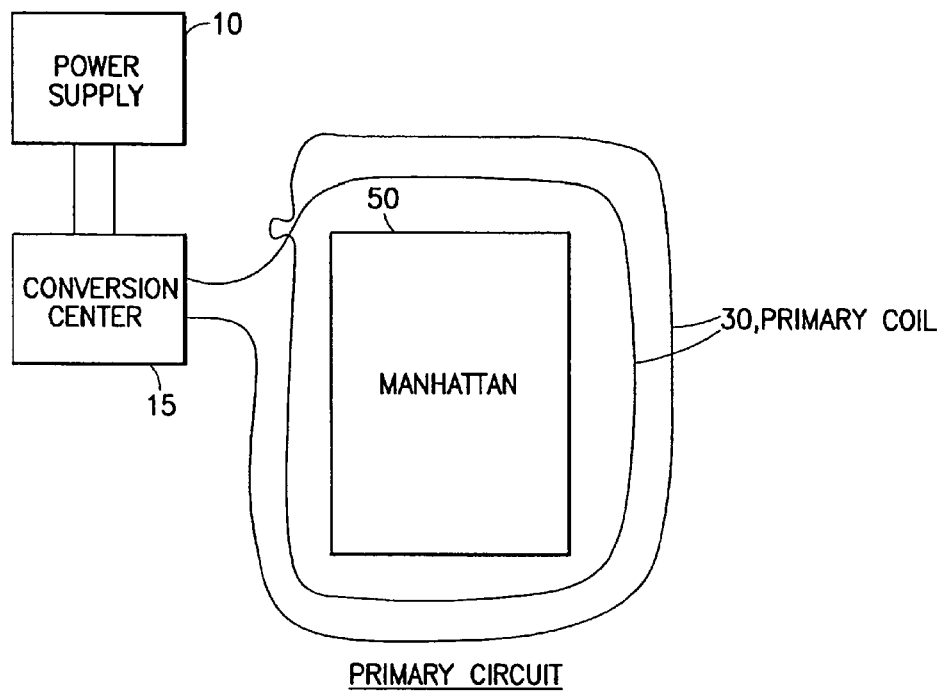
FIG. 1 is an illustration of a primary circuit of the power distribution system in accordance with an exemplary embodiment of the invention.

In one embodiment, the power transfer can take place via multiple known ways. One is similar to ways known in the art as inductive transfer of electromagnetically coupled resonating circuits. FIG. 1 is an illustration of a primary circuit of the power distribution system in accordance with an exemplary embodiment of the invention, where the primary circuit comprises a circuit that contains a primary coil and a power supply. Any power supply 10, such as a power plant or power transmission line, power lines or a power reception device, such as a Tesla Coil, are connected through conductors to a primary coil 30 that loops around the region for which power is being distributed, such as the island of Manhattan 50 in New York City. The power supplied to the primary coil 30 is in the form of an oscillating current or voltage at a frequency chosen for this grid system or region of power distribution.

Typically, the frequency of the power supply is not the frequency of the grid system. Consequently, the primary circuit is provided with a conversion center where the frequency of the voltage or current is converted into the desired frequency. In addition, the voltage or the current of the power supply might not be optimal for wireless power distribution. It is therefore contemplated that the conversion center 15 is configured to also convert the voltage or current to the levels suitable for wireless power distribution.

Technology is known for performing the foregoing types of conversions. Notwithstanding, the material used for the primary coil 30 should be selected based on the frequency of the oscillating current or voltage, as well as the amplitude of the current wave. In order to reduce the power loss in the primary coil it may be practical to use superconducting wires that are cooled to their superconducting state. For high frequencies, however, it may be more practical to use a stranded metallic wire rather than a single conducting strand due to the skin effect. The skin effect is the tendency of an alternating electric current (AC) to distribute itself within a conductor so that the current density near the surface of the conductor is greater than that at its core. That is, the electric current tends to flow at the "skin" of the conductor.

Whether the conductor is metallic or superconducting, the cross-sectional area of the conductor, with the skin effect taken into account, is selected based on the frequency and the magnitude of the current within the coil 30. Another parameter of the primary coil 30 is the number of loops that the coil makes about the region to which power is being distributed. In one embodiment, the number of loops composing the primary coil is about 2 or 3; it is important to make a uniform field within the region.

Figure 2:
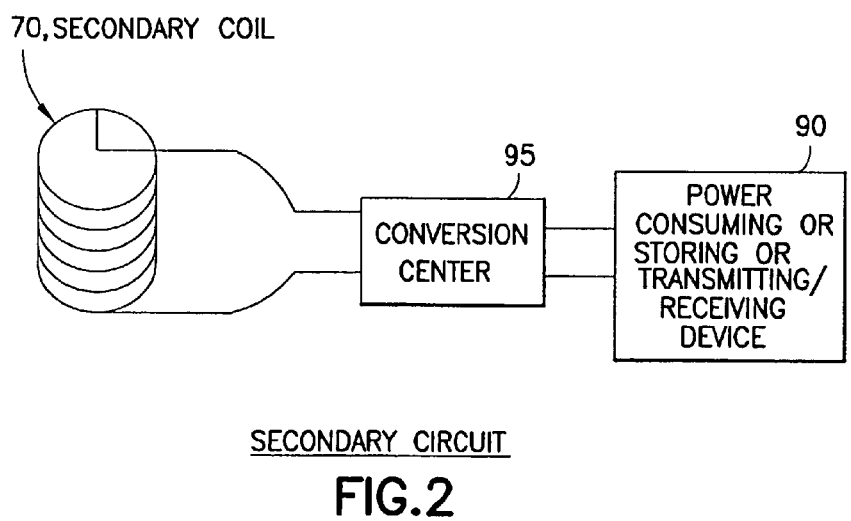
FIG. 2 is an illustration of a secondary circuit of the power distribution system in accordance with an exemplary embodiment of the invention.

FIG. 2 is an illustration of a secondary circuit of the power distribution system in accordance with an exemplary embodiment of the invention, where the secondary circuit comprises a circuit that contains the secondary coil and a device that is consuming power. In order to receive power, any device 90 that is consuming, storing or receiving power may be connected to a secondary coil 70 that resonates at the frequency of the current or voltage oscillation in the primary coil 30. The device 90 that is consuming, storing or receiving power may be connected to the secondary coil 70 through conductors. The power supplied by the secondary coil 70 to the device 90 that consuming, storing or receiving power is in the form of an oscillating current or voltage at a frequency selected for this grid system or region of power distribution, which should be the resonate frequency of the secondary coil 70. Typically, the frequency is not a frequency that is suitable for the device 90 that is consuming, storing or receiving power. Consequently, the secondary circuit is provided with a conversion center 95 where the frequency of the voltage or current is converted into the desired frequency, which may also be a direct current (DC), i.e., the frequency suitable for the receiving device or devices. In addition, the voltage or the current of the secondary coil might not be appropriate for the device that is receiving power. It is, therefore, contemplated that the conversion center 15 is configured to also convert the voltage or current to the levels suitable for the device.

As before, technology is known for performing the foregoing types of conversions. The material for the secondary coil 70 possesses the same parameters as that of the primary coil 30. Preferably, the number of turns forming the secondary coil 70 is selected such that the resonant frequency of the secondary coil 70 is that of the frequency of the current or voltage wave in the primary coil 30.

In an embodiment, the device attached to the secondary coil of FIG. 2 is configured to transmit power. Consequently, the device itself may not consume the power but may, instead, transmit the power to another device or devices located in the same region. For example, multiple devices may co-exist in a particular region, where only one device is required to possess a secondary coil 70. Here, the solitary secondary coil 70 would transmit power wirelessly to the other power consuming devices that are located in the region.

There are known techniques for supplying a secondary device with power from another device, such as by induction, as described in projects untaken by MIT and IBM. Other technology company use lasers that do not harm biological life. In accordance with the contemplated embodiments, the transmitting device may be a Tesla coil.

Figure 3:
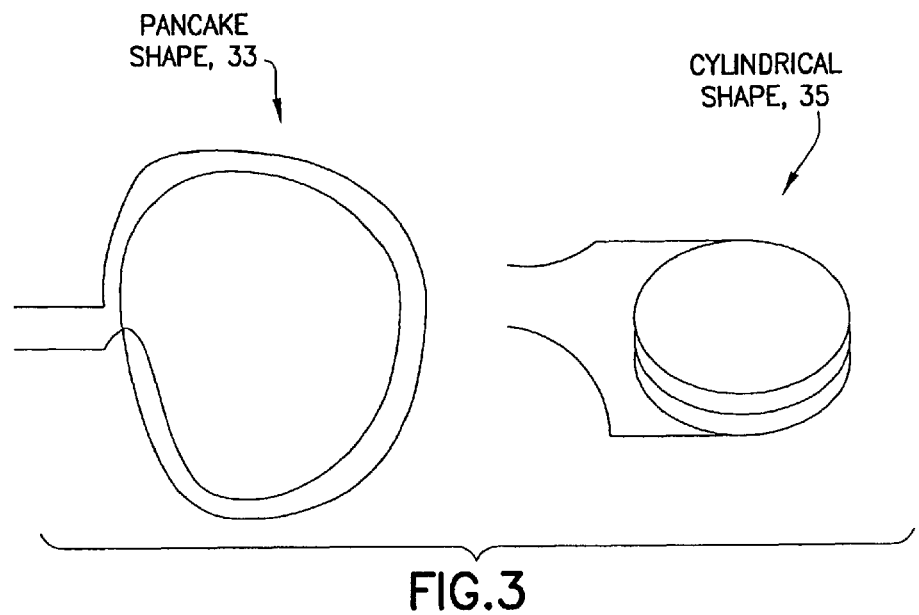
FIG. 3 is a schematic illustration of exemplary forms of primary coil windings of FIG. 1.

FIG. 3 is a schematic illustration of different forms of primary coil 30 windings. Here, the primary coil 30 may be wound in a flat or pancake shape 33 or in a cylindrical shape 35. In the pancake shape, the conductor spirals inward or outward in a manner such that the entire conductor lies in one horizontal plain. In the cylindrical shape, the conductor spirals upward or downward in a manner such that the different sections of the coil lie in different horizontal planes. The pancake or flat style winding is shown in the exemplary embodiment of FIG. 1.

Figure 4:
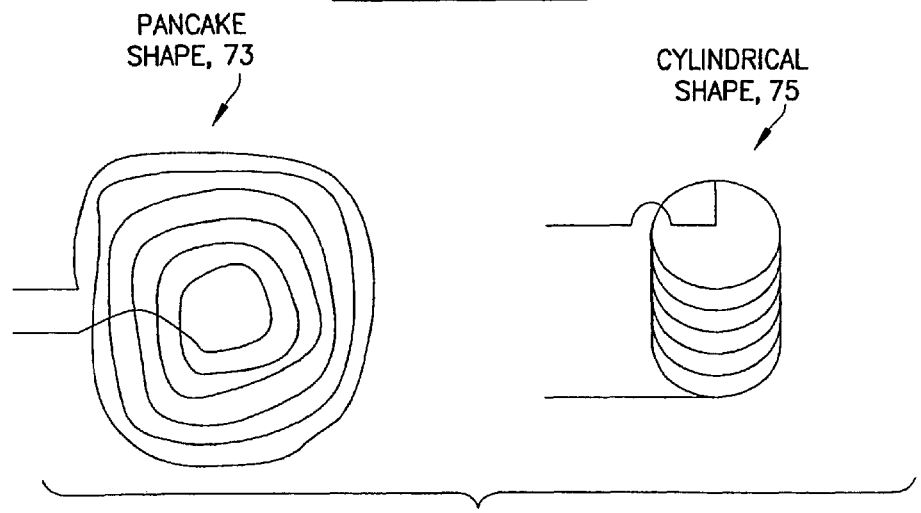
FIG. 4 is a schematic illustration of exemplary forms of secondary coil windings of FIG. 2.

FIG. 4 is a schematic illustration of different forms of secondary coil 30 windings of FIG. 2. Here, the secondary coil 70 may be wound in a flat or pancake shape 73 or in a cylindrical shape 75.

Figure 5:
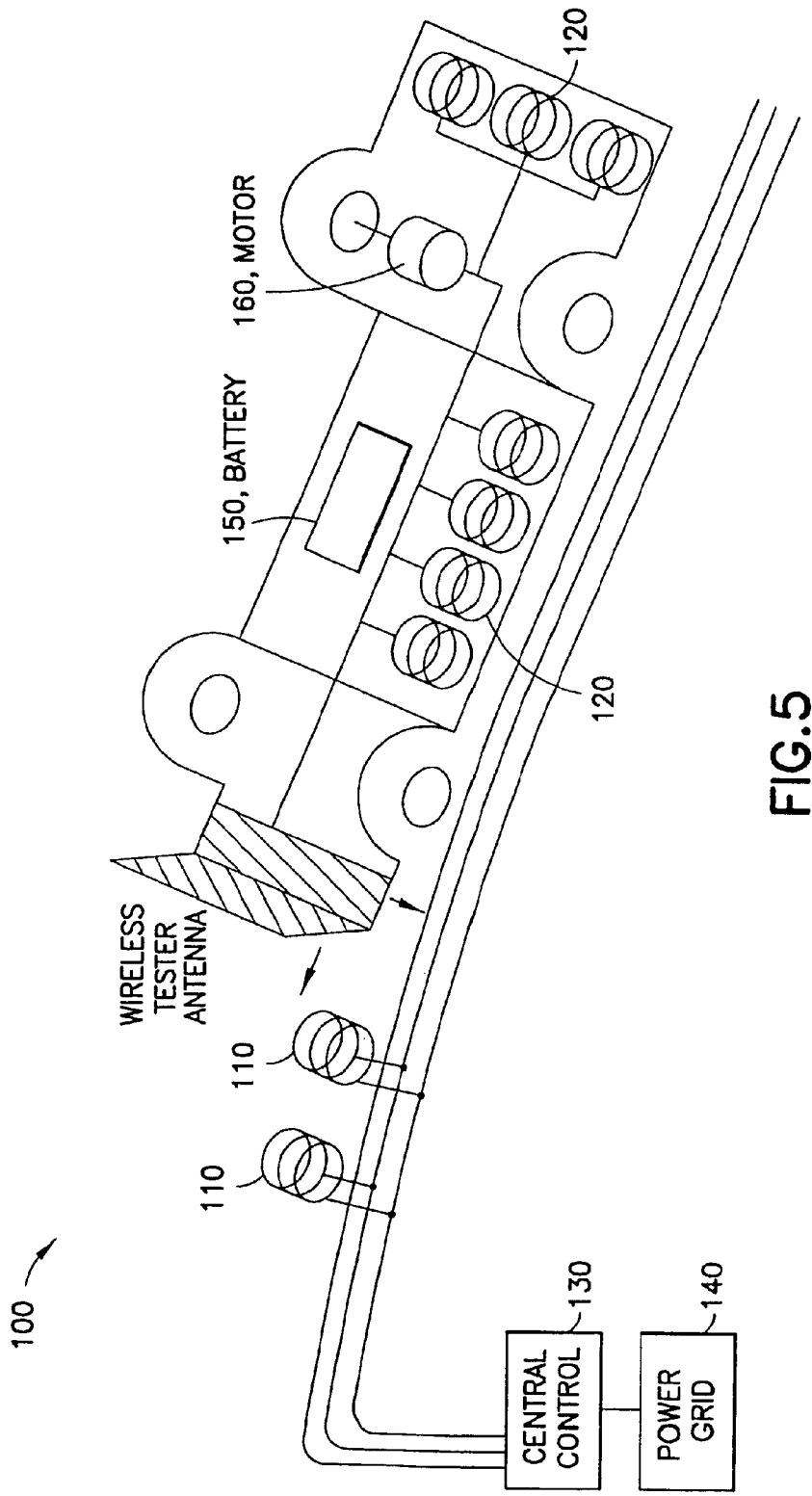
FIG. 5 is a schematic block diagram of a system for wireless power distribution in accordance with the invention.

FIG. 5 is a schematic block diagram of a system for wireless power distribution in accordance with the invention. For short distances and medium and high power, capacitively loaded coil loops 110, 120 should be used. One loop 110 is coupled via a central controller 130 to an alternate current source 140 and the other coil loop 120 to a battery 150 or electrical engine 160. Such coil loops 110, 120 and power sources 140 should be tuned to frequencies above 500 Khz for best performance. In addition the transmitting and receiving coil loop sizes and shapes need to be designed to match the frequency selected and ensure that the electrical field and magnetic field generated by the coil loops are perfectly out of phase to maximize the transmission of power and minimize absorption and cancellation.

Figure 6:
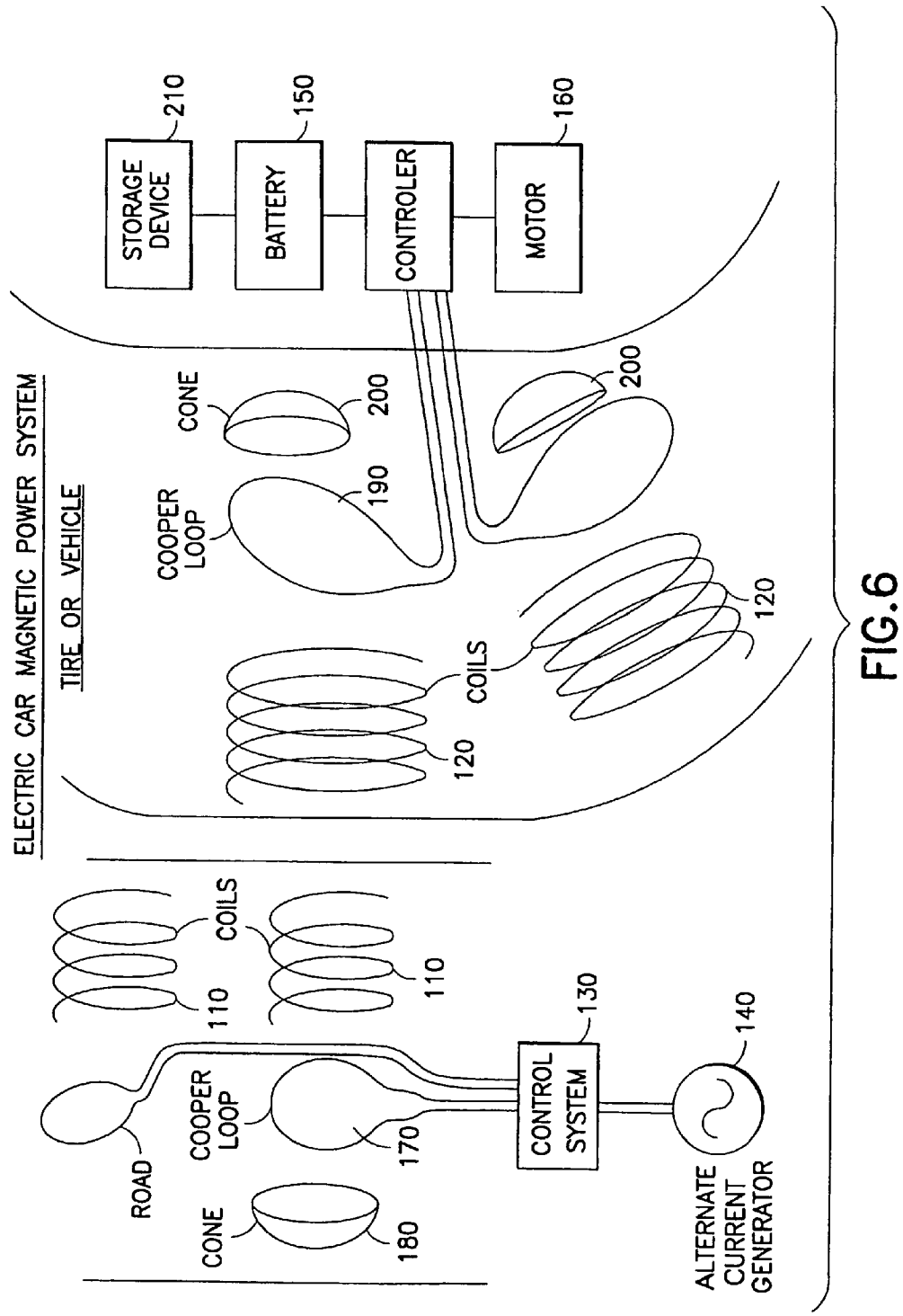
FIG. 6 is a schematic illustration of the transmitting loop and receiving loop in accordance with the invention.

FIG. 6 is a schematic illustration of the transmitting loop and receiving loop in accordance with the invention. The transmitting loop 170 may be blocked with a cone 180 or half-ball-shaped metallic object pointing away from the receiving loop 190 and coated or made of materials capable of reflecting any electric and/or magnetic fields to maximize the resonance between the circuits. A parallel cone 200 can be placed behind the receiving end to maximize such effect. Such cones may be electrically charged to maximize the electromagnetic wave and the apparatus performance and maximize resonance.

This design helps efficiency by tunneling the magnetic field generated by the transmitting coil loops 110 to receiver coil loops 120 that resonate at the same frequency. This design further minimizes the transmission of dissipation of electric fields, radio waves and loss of power provided to the apparatus. Since magnetic fields interact very weakly with human tissue and other matter and since coupled circuits only resonate if they are tuned to the same frequency, very little interference is caused to the environment and very high efficiency levels of transmission can be achieved while still maintaining IEEE and other industry standards for such emissions. Under optimal condition over 90% of transmitted power can be absorbed and regenerated for distances below 3 feet.

In one embodiment, the transmitter coil is located on a transmitter tower (not shown) which is configured to resonate at a specific frequency, such as the free 13.56 MHz industrial, scientific and medical (ISM) radio band. The second component is a second or 'receiver' coil wound in a 'pancake', which is also configured to resonate at the same frequency as the transmitter coil or at a combination of several frequencies.

In the transmitter tower embodiment, the system and method of the invention relies on a power station to wirelessly transmit a high frequency modulated signal from the transmitter coil. Such a transmission can extend over a radius of 20 miles or more via the use of directional resonance modulation and allows any receiver coil that is tuned to the same transmission frequency of the transmitter coil to absorb and convert the transmission back into electrical energy, which can then be used immediately by the vehicle or stored in on-board batteries for use at a later time.

In accordance with the invention, the system and method implemented in the vehicle or device uses the transmitted power or energy to charge its on-board capacitors 210 and batteries 150 and to operate the vehicle or device, such as to propel the vehicle in the desired direction. In accordance with the invention, while the vehicle is not in motion or is stationary, the excess power or energy is used to charge to capacity all on-board batteries within the vehicle. Alternatively, the system implemented in the vehicle may generate hydrogen or other stored energy through a process, such as electrolysis. However, when the vehicle is in motion, but outside of the coverage range of the wireless system, it then operates on battery reserve, thus drawing on the energy stored in the batteries 150 or hydrogen tanks.

In an embodiment of the invention, the vehicle uses an exterior plastic or metal shell that is provided with imbedded wiring as the coil inductor to maximize the amount of absorbable energy.

In another embodiment, the transmission of power or energy by the primary coil will occur only after a vehicle or device has wirelessly identified itself and has been authenticated to use the power transmission services. Upon being verified to use the service, transmission of the electromagnetic waves that are located in close proximity to the vehicle or device is commenced or activated to thereby allow power charging to occur. Upon completion of the charge, the vehicle will send another wireless transmission to the primary coil or to some other destination to indicate that it has received a desired charge level. A reversal of the process can take place and the controller may request the transfer of power back to the grid via wireless means.

Figure 7:
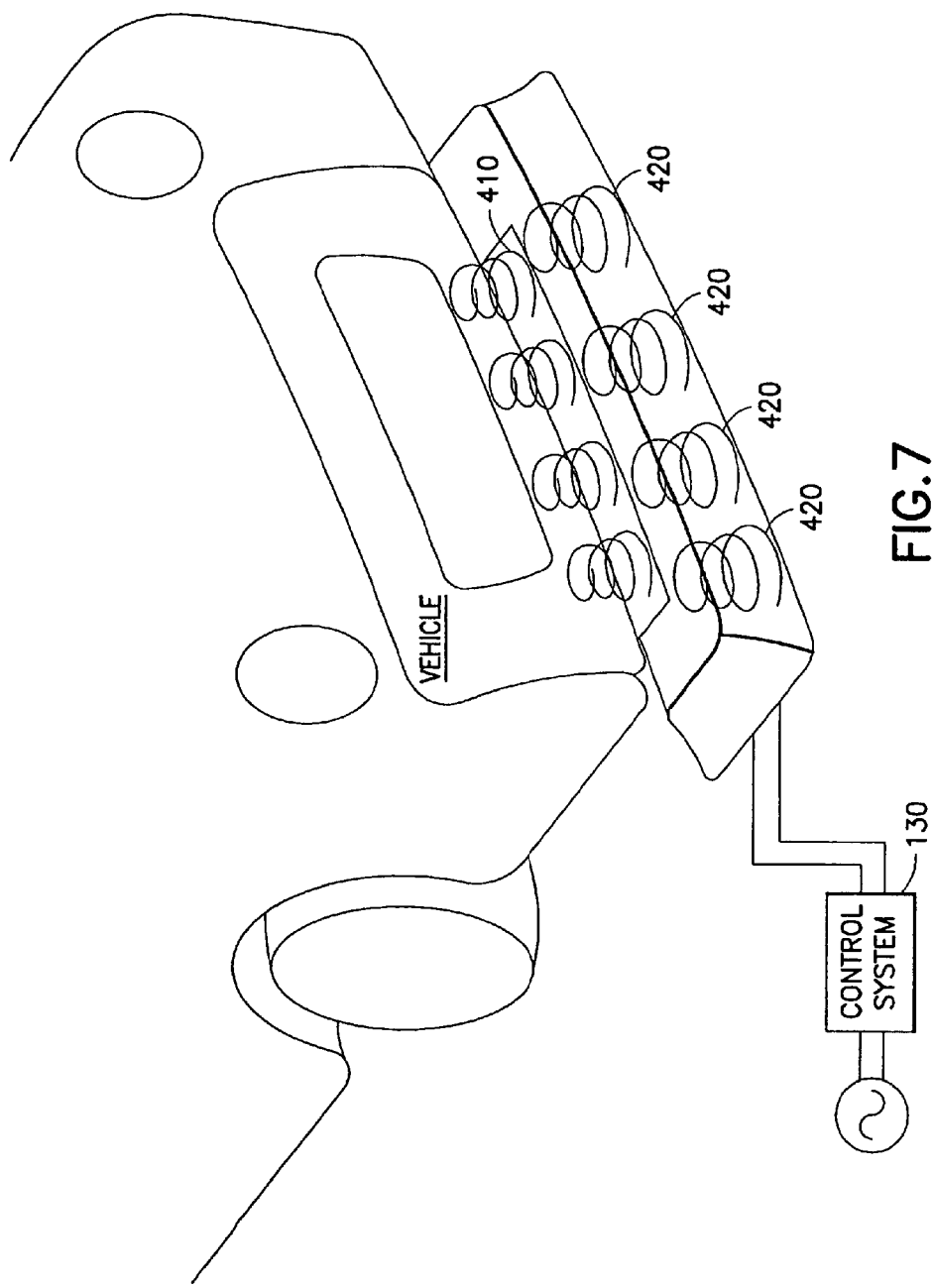
FIG. 7 is an exemplary illustration of coils 410 embedded into parking spots that include the primary coils in accordance with the invention.

The wireless transmission can be performed from a central location or can be distributed with many primary coil antennas and cables that cover a large geographical area. Such coils may be embedded into parking spots, placed by traffic light lanes, fueling stations and other ordinary stops. They may also be embedded into roads or placed as strips on top of existing roads. FIG. 7 shows such an exemplary configuration, where the coils 410 are embedded into parking spots that include the primary coils 420.

In accordance with another embodiment, the transmitters may be installed along regular roads or highways, traffic lights or parking spots or in conjunction with existing high voltage wire infrastructure. As a result, each vehicle will be provided with an identifier and, thus, allows metering and billing for the use of consumed power. In yet another embodiment, the user pays a flat monthly fee for an unlimited use of such wirelessly transmitted power.

Figure 8:
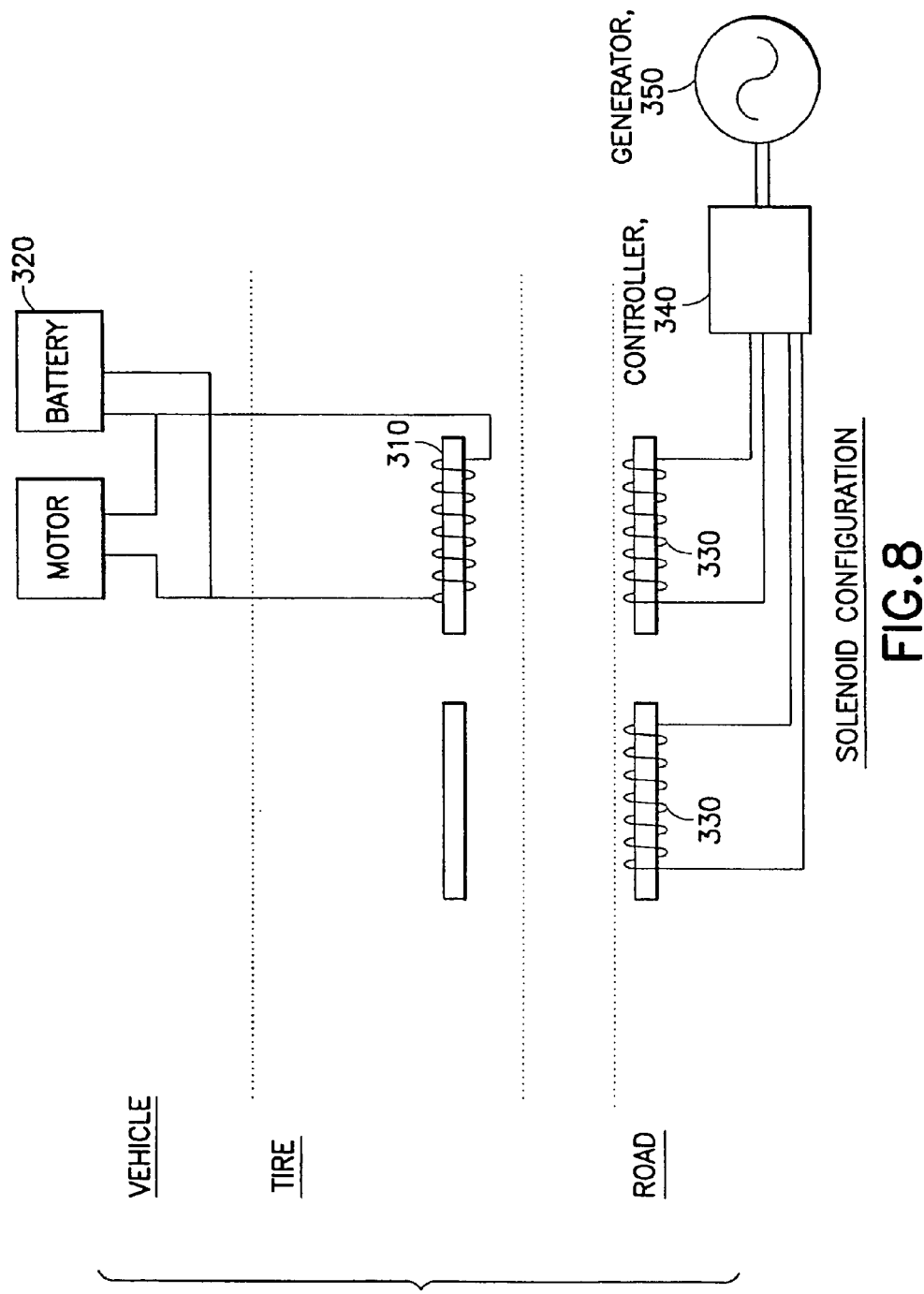
FIG. 8 is schematic illustration of the solenoids that are configured in accordance with the exemplary embodiments.

In accordance with another embodiment, the short distance coupling through interaction with transmitters located on or in the road can be performed via Evanescent wave coupling where waveguides and circuits on the road and tires or vehicle surface are employed. FIG. 8 is schematic illustration of the solenoids that are configured in accordance with the exemplary embodiments. A solenoid 310 is employed to induce an horizontal or vertical array of conducting wires to create resonance in a desired predetermined frequency upon request from the network, vehicle or upon contact. FIG. 9 is a schematic illustration of tires of a vehicle that are configured to permit wireless distribution of power to the vehicle.

With reference to FIGS. 8 and 9, a copper or aluminum loop coil 310 located inside the tires of the vehicle can be coupled to the batteries 320 in the vehicle, and through induction, absorb electrical energy transmitted through the transmitter coils 330 buried in the road surface which are coupled to a control station 130 and connected to a power source 140. For example, the transmitter coil 330 can be imbedded inside the asphalt, concrete or a rubber strip placed on top or besides the road. The rubber strip contains rings or mesh of electrical wires forming coils best designed to allow for wireless coupling and may be combined with capacitors, sensors and remotely activated switches to generate and optimize wireless transmission of electrical power. The same configuration needs to be used on the receiving end and tuned to the same resonance to effect the most efficient transmission of electrical power. Such transmitting elements are to be segmented into small continuous segments which are connected to a control station to activate the right segments at the right time. This causes only a small number of transmitting segments to be powered at any time for any vehicle. Receiving surfaces such as antennas or cones are embedded in appropriate parts of the vehicle to maximize reception. Alternatively, segments may be activated by contact, pressure or by direct signals from the vehicle or a monitoring and tracking station, as shown in schematic form in FIG. 9.

This implementation allows for high power transmission without affecting the environment or other neighboring radio receiving devices. It is best to use frequencies which are authorized by the FCC or other government bodies for public use like 2.4, 5.1 and 13 Mhz in the US. Vehicles or other mobile systems and devices can tune to one of available frequencies and charge their internal batteries. Since different countries may use different frequencies the receiving device such as air crafts can use tuning or multiple apparatus to enable it to be compatible to such diverse systems.

Vehicles with mounted coils and copper loops may have a dynamic mechanical rotation device powered by electrical or pneumatic engines which, with the use of gyros or other sensitive detectors, ensure optimal coupling of the circuits and optimal transfer of energy. Thus, if a vehicle is tilting, while making turns at high speeds during which the loops and coils mounted on the vehicle body and its tires change their angle towards the transmitting coils, the vehicle mounted coils and loops may be continuously adjusted dynamically and instantly to realign themselves for optimal reception. In other systems, such as an airplane, a directional receiving antenna connected to a tracking system mounted on top or bottom of the airplane can be used to absorb electromagnetic power and use it for propulsion.

Vehicles and other devices may need to authenticate and log themselves to enable the power transmission. Such enablement can be made via wireless systems known in the art, e.g., data over power lines, Ezpass, RFID or other type of wifi or other wireless transmission, etc., to identify and register with the local provider of the power network. Such authentication may also include the type of vehicle and lanes needed, the time of day the vehicle is used (e.g. rush hour, off peak hours, etc.) as well as power level and transmission level required. Because tractor-trailer trucks may use two lanes of tires, a power transfer may be utilized by enabling two strips instead of one. Different vehicles may have different implementations of such wireless transmission and may require different voltage or wattage to operate at full capacity. The controller of such grid can then effect such requested levels by sending appropriate instructions to the specific segments servicing such vehicle in real time. Many different vehicles may occupy the same lane at the same time while the controller will activate and feed the appropriate power and transmission to the right vehicle as it moves from one segment on the road to the next. Power and signal converters embedded with the coils may be used to control such changes.

Upon vehicle identification, a driver will operate the vehicle along a powered and marked lane. Inside the vehicle a bar or number will identify that the vehicle is connected to the grid and the level of power and efficiency of the current grid utilization by the vehicle. Such efficiency may indicate the positioning of the vehicle to the lane, i.e. the vehicle being directly above the transmitting lane or not fully aligned, and such information may be used to manually or electronically align the vehicle with the transmitting lane and optimize the charge. The grid may vary its transmission based on the speed of the vehicle or the type of receiving apparatus used by the vehicle.

The vehicle may absorb sufficient power to effect locomotion as well as charge the internal batteries and as such, the internal system may indicate the time remaining for full charge of the internal batteries. A driver may select a specific route or obtain a GPS enabled route which will indicate how to get to a destination while fully charging the batteries, i.e. to travel along a route that includes such power transmission lanes. Beyond battery charge excess, absorbed power in the vehicle may be used to generate hydrogen via electrolysis and store such hydrogen for future use. A fuel cell mounted in the vehicle may be used to convert such hydrogen back to electrical power to charge the batteries or move the vehicle.

The driver may navigate the vehicle off the powered lane at any time and use the stored power to continue movement. Because all absorbed electrical power first goes to the batteries and then to the electrical engine, a diversion from a power lane stops continuous charging but does not effect the movement of the vehicle.

Each vehicle wireless IP signal and speed information is transferred to the controlling station on the grid and activates power or wireless transmission to the segments of the power strips that should be powered at that time. The activated length of the power strips can also be changed based on the speed of the vehicle. The system may also control traffic information by sending back signals to the car to slow down or change course based on congestion or traffic conditions.

The same circuitry can be used to provide two way data communications to and from the vehicle by using the same set of inductive coils. Data transmission to and from the vehicle is achieved by applying absorption modulation, data transmission to the network by applying amplitude modulation. This is similar to data over power lines which is widely used but has not been combined with induction power transfer.

By continuously charging through a wireless system, the vehicle or device can therefore dramatically extend its range and provide for continuous, uninterrupted operation. The vehicle uses the aerials or antennas for power reception, and the ground is used as a return if necessary, with the capacitors, batteries and motors being connected in between. At any given moment in time, the power or energy collected by the vehicle may be more or less than what is needed to propel the vehicle. As a result, the vehicle will either contribute or draw upon the stored electrical energy in the on-board batteries and capacitors.

Another embodiment is using magnets and other elements to ensure a direct contact between the vehicles and the units providing for wireless charge while the vehicles are at rest in charging areas. Such units may have springs and magnets which ensure the car bumpers or tires have no damage but have full reception of the electrical power from the transmitting elements. For example in a parking lot designated slots may be enabled and marked with power transmissions and a vehicle may position its receiving element to touch the transmitting element to ensure optimal transfer of energy without the need of the driver to plug any cables or even get out of the vehicle. An internal indicator shows the level of contact and charge and can predict the time it would take to get fully charged.

In a similar fashion an air craft may re-align its receiving coils and loops to maintain maximum power absorption from a ground or space based station.

A separate antenna with coupled capacitors may be implemented as well to absorb power from distant power sources. Such system may use different technologies and be suitable for lower power vehicles or aircraft it may allow a much broader coverage in areas without powered roads or remote locations. Airplanes and other flying devices may receive their power from such systems as well.

Alternatively in another embodiment a combination of induction and electrical plates configured to use the Tesla Effect can be used to eliminate the need to have a grounding wire and conductive lanes on the roads. This new configuration allows for mobile ungrounded use of vehicles and airplanes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. An electric vehicle charging system, comprising:
a secondary resonant coil operatively connected to a load within an electric vehicle and which is tuned to have a resonant frequency that is substantially the same as a resonant frequency of a primary resonant coil located outside the electric vehicle, wherein the primary resonant coil is operatively connected to a source of electrical power;
a coil located between the primary resonant coil and the secondary resonant coil, wherein the coil electromagnetically couples electrical power from the primary resonant coil to the secondary resonant coil for extending an electromagnetic coupling distance over which the electrical power can be transferred between the source and the load; and
a conversion element coupled to the secondary resonant coil for converting the electrical power received by the secondary resonant coil to produce converted electrical power, wherein the converted electrical power is coupled to the load.

2. The charging system of claim 1, wherein the coil is capacitively loaded.

3. The charging system of claim 1, further comprising a charge monitoring element that produces a charge indication signal indicative of a charge level of the load reaching a desired level.

4. The charging system of claim 1, wherein an efficiency of electrical power transfer from the primary resonant coil to the secondary resonant coil is greater than 90%.

5. The charging system of claim 1, wherein the load comprises a storage device.

6. The charging system of claim 1, wherein the load comprises a motor.

7. The charging system of claim 1, wherein the coil tunnels an electromagnetic field produced by the primary resonant coil in such as a manner as to increase an efficiency of electrical power transfer from the primary resonant coil to the secondary resonant coil.

8. The charging system of claim 1, further comprising a reflecting element positioned to reflect an electromagnetic field produced by the coil in such a manner as to increase an efficiency of electrical power transfer from the coil to the secondary resonant coil.

9. The charging system of claim 1, further comprising a reflecting means for reflecting electric and/or magnetic fields.

10. The charging system of claim 1, wherein the reflecting means comprises a cone.

11. The charging system of claim 1, further comprising a further coil located between the coil and the primary resonant coil.

12. The charging system of claim 1, wherein the charging system is further configured to facilitate transmission of data along with the transfer of the electrical power.

13. The charging system of claim 1, further comprising a power transfer system that is configured to cause the charging system to transfer electrical power from the storage device to an external power grid via the secondary resonant coil and the coil.

14. The charging system of claim 1, wherein the electrical power received by the secondary resonant coil is AC power and the converted electrical power comprises DC power.

* * * * *